United States Patent
Kosugi et al.

(10) Patent No.: US 10,212,786 B2
(45) Date of Patent: *Feb. 19, 2019

(54) VEHICLE LIGHTING DEVICE AND VEHICLE LAMP

(71) Applicant: Toshiba Lighting & Technology Corporation, Yokosuka-shi, Kanagawa-ken (JP)

(72) Inventors: Daisuke Kosugi, Yokosuka (JP); Atsushi Heike, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,501

(22) Filed: Oct. 23, 2017

(65) Prior Publication Data

US 2018/0049295 A1  Feb. 15, 2018

Related U.S. Application Data

(63) Continuation of application No. 15/417,374, filed on Jan. 27, 2017.

(30) Foreign Application Priority Data

Feb. 1, 2016  (JP) .................. 2016-017011
Apr. 27, 2016  (JP) .................. 2016-088796

(51) Int. Cl.
*B60Q 1/14* (2006.01)
*H05B 37/02* (2006.01)
*H05B 33/08* (2006.01)

(52) U.S. Cl.
CPC ..... *H05B 37/0227* (2013.01); *H05B 33/0815* (2013.01)

(58) Field of Classification Search
CPC .................. H05B 37/0227; H05B 33/0815
(Continued)

(56) References Cited

U.S. PATENT DOCUMENTS

2007/0170876 A1  7/2007  Ito et al.
2009/0160365 A1  6/2009  Niemitalo
(Continued)

FOREIGN PATENT DOCUMENTS

EP      2416624 A1      2/2012
FR      3020122 A1      10/2015
JP      2013-229385 A   11/2013

OTHER PUBLICATIONS

Dec. 18, 2017—(US) Notice of Allowance—U.S. Appl. No. 15/417,374.
Mar. 9, 2018—(EP) Office Action—App 17153039.7.

*Primary Examiner* — Don Le
(74) *Attorney, Agent, or Firm* — Banner & Witcoff, Ltd.

(57) ABSTRACT

According to one embodiment, a vehicle lighting device includes a first circuit portion that has at least one light emitting element and a first resistor connected in series to the light emitting element; a second circuit portion that is connected in parallel to the first circuit portion and has at least a control portion; and a third circuit portion that is connected in series to the first circuit portion and the second circuit portion, and has at least one light emitting element. The control portion measures an input voltage and causes a current to flow through the third circuit portion in a case where the measured input voltage is a predetermined value.

18 Claims, 11 Drawing Sheets

(58) Field of Classification Search
USPC .......................................................... 315/77
See application file for complete search history.

(56) References Cited

U.S. PATENT DOCUMENTS

| | | |
|---|---|---|
| 2010/0117538 A1 | 5/2010 | Fujino |
| 2011/0181186 A1 | 7/2011 | Nakano et al. |
| 2011/0199003 A1 | 8/2011 | Muguruma et al. |
| 2011/0273102 A1 | 11/2011 | van de Ven et al. |
| 2011/0285319 A1 | 11/2011 | Chao et al. |
| 2012/0081009 A1 | 4/2012 | Shteynberg et al. |
| 2013/0063035 A1 | 3/2013 | Baddela et al. |
| 2013/0069535 A1 | 3/2013 | Athalye |
| 2013/0175924 A1 | 7/2013 | Codutti et al. |
| 2014/0159594 A1 | 6/2014 | Chang |
| 2014/0300274 A1 | 10/2014 | Acatrinei |
| 2015/0002035 A1 | 1/2015 | Schie et al. |
| 2015/0061535 A1 | 3/2015 | Hino |
| 2015/0108909 A1 | 4/2015 | Rupp |
| 2015/0230298 A1* | 8/2015 | Chu .................. H05B 33/0815 315/186 |
| 2016/0205741 A1 | 7/2016 | Seki et al. |

* cited by examiner

VEHICLE LIGHTING DEVICE AND VEHICLE LAMP

CROSS-REFERENCE TO RELATED APPLICATIONS

This application is a continuation of U.S. patent application Ser. No. 15/417,374 filed Jan. 27, 2017, based upon and claims the benefit of priority from Japanese Patent Application No. 2016-017011, filed on Feb. 1, 2016, No. 2016-088796, filed on Apr. 27, 2016; the entire contents of which are incorporated herein by reference.

FIELD

Embodiments described herein relate generally to a vehicle lighting device and a vehicle lamp.

BACKGROUND

There is a vehicle lighting device including a plurality of light emitting diodes (LEDs) which are connected in series.

Here, a voltage applied to the vehicle lighting device fluctuates. Therefore, in the vehicle lighting device, an operating voltage range (voltage fluctuation range) is determined.

In addition, the light emitting diode has a forward voltage drop. Therefore, when the voltage applied to the plurality of light emitting diodes connected in series decreases, an amount of light emitted from the plurality of light emitting diodes decreases and there is a concern that a total luminous flux of the vehicle lighting device becomes less than a specified value.

Therefore, a technique is proposed in which in a case where the voltage applied to the vehicle lighting device decreases, a current does not flow through some light emitting diodes among the plurality of light emitting diodes which are connected in series.

Thus, even in a case where the voltage applied to the vehicle lighting device decreases, it is possible to secure a required total luminous flux.

However, when the current does not flow through some light emitting diodes, there is a new problem that the current flowing through remaining light emitting diodes suddenly increases and the total luminous flux rapidly increases.

Therefore, it is desired to develop a technique in which even in a case where the voltage applied to the vehicle lighting device decreases, it is possible to secure a required total luminous flux and to suppress fluctuation of a total luminous flux.

DETAILED DESCRIPTION

Figure 1:
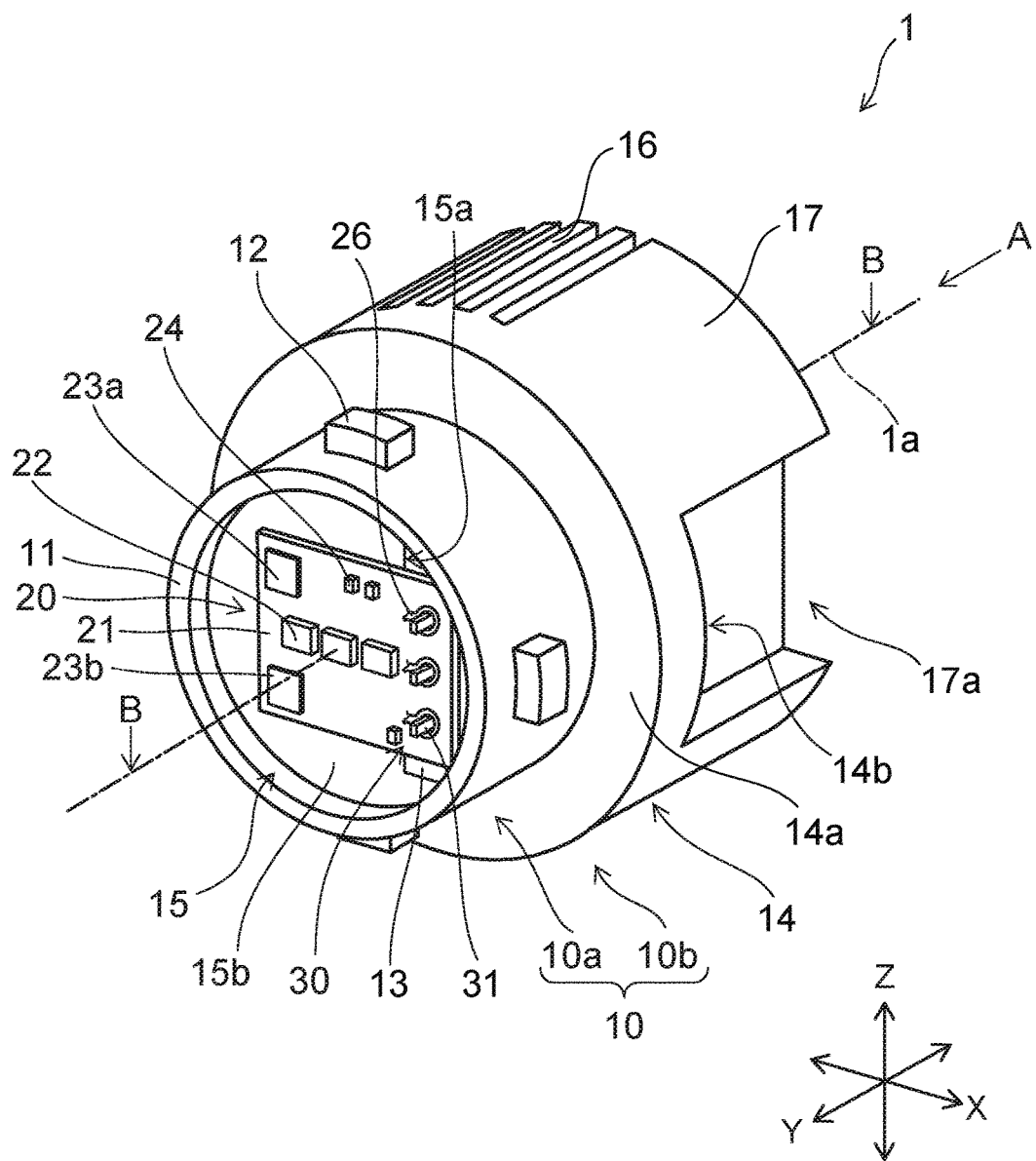
FIG. 1 is a schematic perspective view illustrating the vehicle lighting device 1 according to an embodiment.

In general, according to one embodiment, a vehicle lighting device includes a first circuit portion that has at least one light emitting element and a first resistor connected in series to the light emitting element; a second circuit portion that is connected in parallel to the first circuit portion and has at least a control portion; a third circuit portion that is connected in series to the first circuit portion and the second circuit portion, and has at least one light emitting element. The control portion measures the input voltage and causes a current to flow through the third circuit portion in a case where the measured input voltage is a predetermined value.

According to the vehicle lighting device, even in a case where a voltage applied to the vehicle lighting device decreases, it is possible to secure a required total luminous flux and to suppress fluctuation of the total luminous flux.

Hereinafter, exemplary embodiments will be described with reference to the drawings. Moreover, the same reference numerals are given to the same configuration elements in each drawing and detailed description will be appropriately omitted.

A vehicle lighting device 1 of the exemplary embodiment, for example, can be provided in automobiles, railway vehicles, or the like. As the vehicle lighting device 1 provided in the automobile, for example, a front combination light (formed by appropriately combining, for example, a daytime running lamp (DRL), a position lamp, a turn signal lamp, and the like), a rear combination light (formed by appropriately combining, for example, a stop lamp, a tail lamp, a turn signal lamp, a back lamp, a fog lamp, and the like), and the like can be exemplified. However, application of the vehicle lighting device 1 is not limited to the examples.

FIG. 1 is a schematic perspective view illustrating the vehicle lighting device 1 according to the embodiment.

Figure 2:
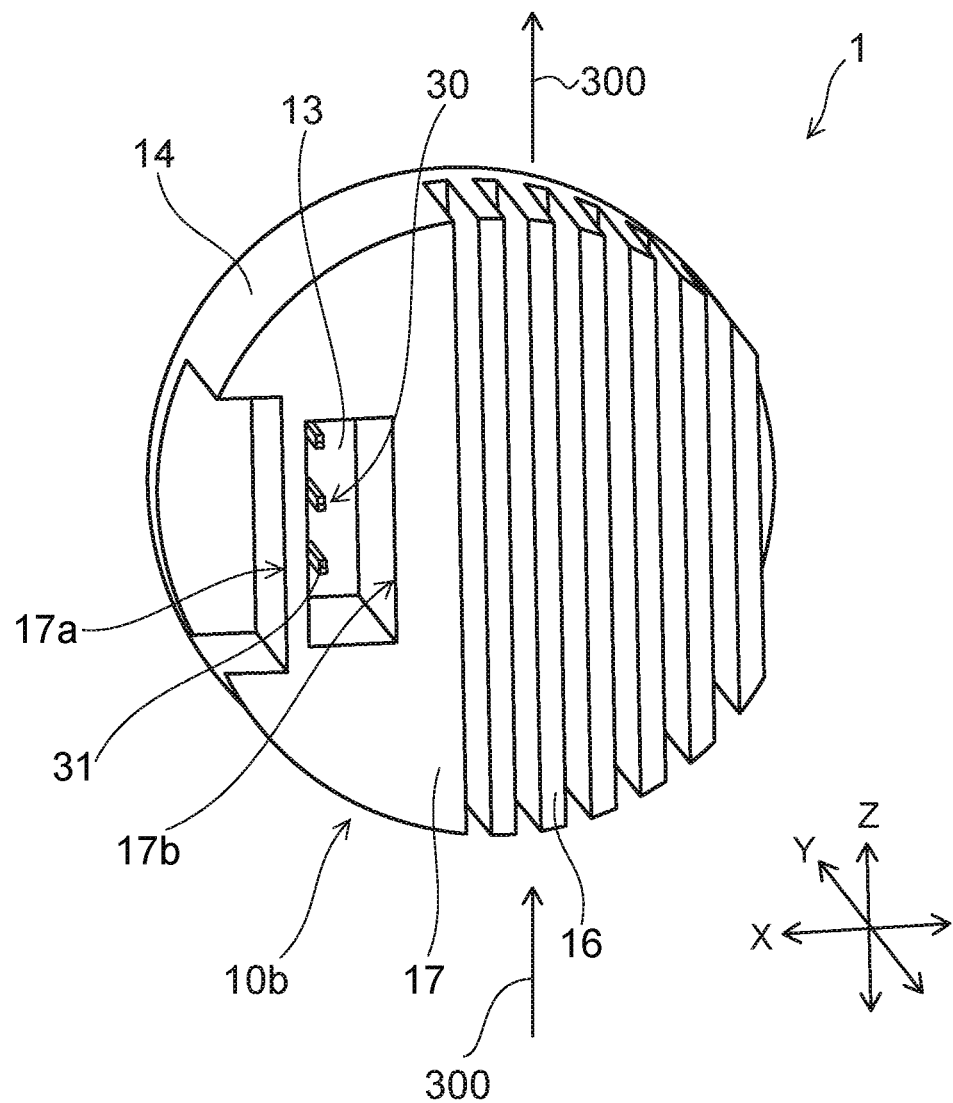
FIG. 2 is a schematic view of the vehicle lighting device 1 viewed in a direction A in FIG. 1.

FIG. 2 is a schematic view of the vehicle lighting device 1 viewed in a direction A in FIG. 1.

Figure 3:
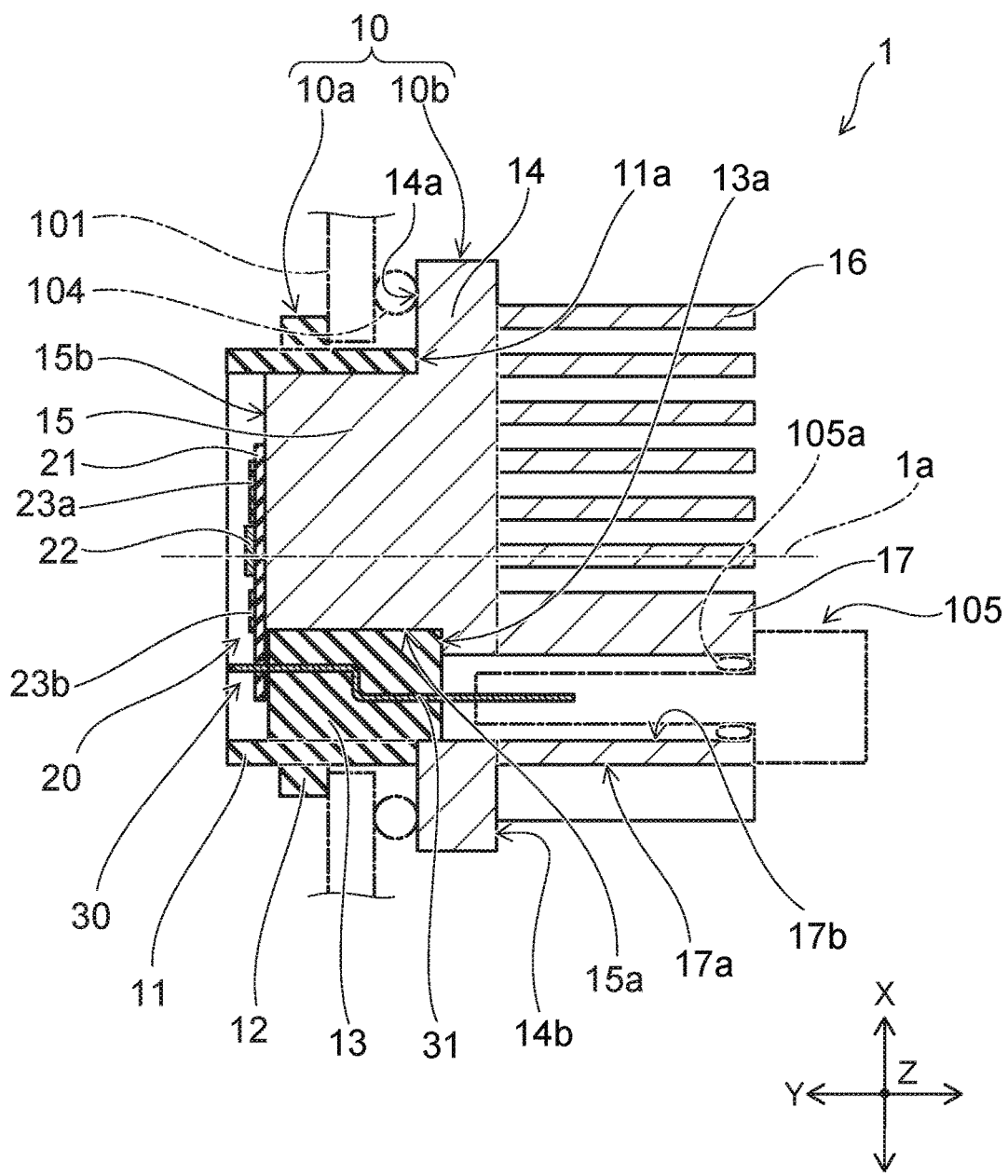
FIG. 3 is a schematic sectional view of the vehicle lighting device 1 in a direction of line B-B in FIG. 1.

FIG. 3 is a schematic sectional view of the vehicle lighting device 1 in a direction of line B-B in FIG. 1.

Moreover, an X direction, a Y direction, and a Z direction in each figure indicate three directions orthogonal to each other. For example, when attaching the vehicle lighting device 1 to a vehicle lamp 100, a direction that is a rightward and leftward direction (horizontal direction) can be the X direction, a direction that is a forward and rearward direction (horizontal direction) can be the Y direction, and a direction that is an upward and downward direction (vertical direction) can be the Z direction.

As illustrated in FIGS. 1, 2, and 3, the vehicle lighting device 1 is provided with a socket 10, a light emitting module 20, and a power supplying portion 30.

The socket 10 has a storage portion 10a and a heat radiating portion 10b.

The storage portion 10a has the mounting portion 11, bayonets 12, and the insulating portion 13.

The mounting portion 11 has a tubular shape. The mounting portion 11 can have, for example, a cylindrical shape. The mounting portion 11 is provided on a side of a flange 14 opposite to a side in which heat radiating fins 16 are provided. The mounting portion 11 surrounds a loading portion 15. An external dimension of the mounting portion 11 in a direction (X direction or the Z direction) orthogonal to a center axis 1a of the vehicle lighting device 1 is smaller than an external dimension of the flange 14.

The bayonets 12 are provided on a side surface of the mounting portion 11 and protrude to the outside of the vehicle lighting device 1. The bayonets 12 face the flange 14. A plurality of bayonets 12 are provided.

Figure 12:
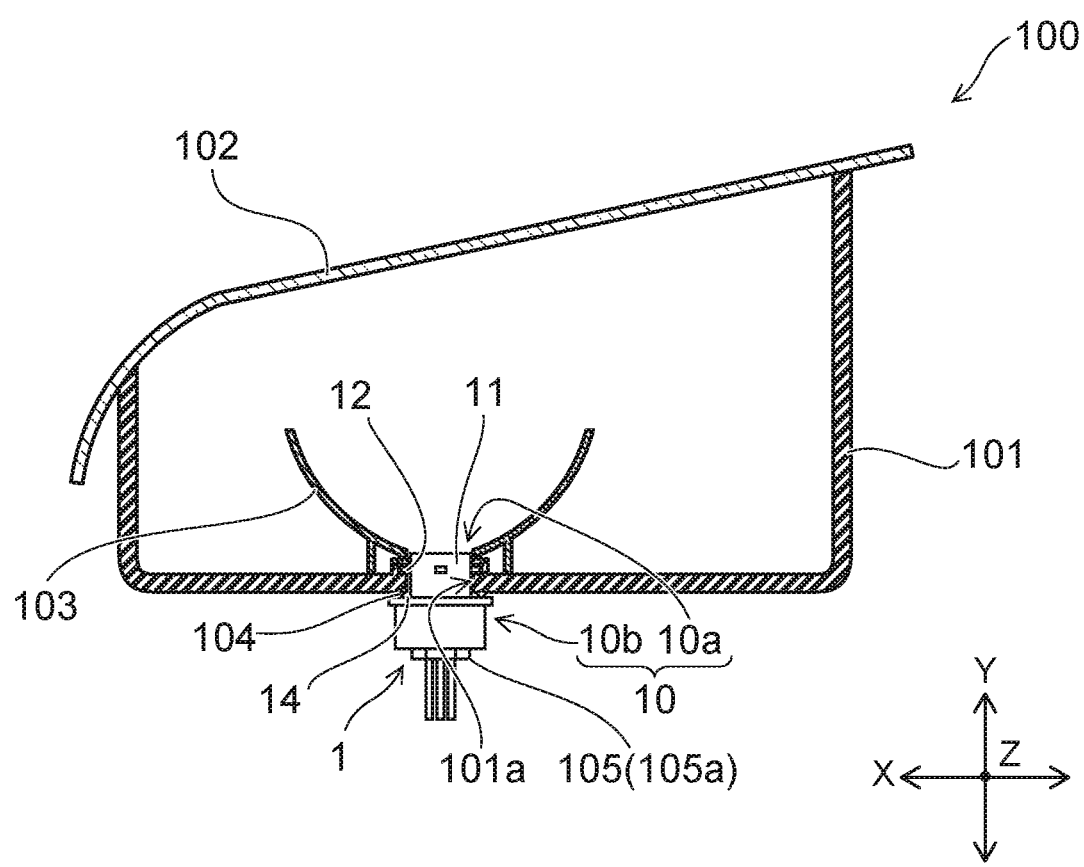
FIG. 12 is a partial sectional view schematically illustrating the vehicle lamp 100.

When mounting the vehicle lighting device 1 on a housing 101, a portion of the mounting portion 11 in which the bayonets 12 are provided is inserted into an attachment hole 101a provided in the housing 101 (see FIG. 12). Then, the vehicle lighting device 1 is held in the housing 101 by rotating the vehicle lighting device 1. That is, the bayonets 12 are provided to be used in twist-lock.

The insulating portion 13 is provided on an inside of the mounting portion 11.

The storage portion 10a can be formed by integrally molding the mounting portion 11, the bayonets 12, and the insulating portion 13 or can be formed by joining these members. However, if the mounting portion 11, the bayonets 12, and the insulating portion 13 are integrally molded, it is possible to improve resistance against an external force and achieve reduction in manufacturing cost.

The storage portion 10a has a function of storing the light emitting module 20 and a function of insulating power supply terminals 31.

Therefore, it is preferable that the mounting portion 11, the bayonets 12, and the insulating portions 13 are formed of an insulating material. The insulating material can be, for example, an organic material such as resin, an inorganic material such as ceramics (for example, aluminum oxide, aluminum nitride, or the like), or the like.

In this case, it is also possible to form the mounting portion 11, the bayonets 12, and the insulating portion 13 from the insulating material having high thermal conductivity considering that heat generated in the light emitting module 20 is transmitted to the outside. The insulating material having high thermal conductivity can be, for example, ceramics (for example, aluminum oxide, aluminum nitride, or the like) and resin having high thermal conductivity. Resin having high thermal conductivity is obtained, for example, by mixing fibers or particles made of aluminum oxide having high thermal conductivity to resin such as polyethylene terephthalate (PET) and nylon.

Moreover, the mounting portion 11, the bayonets 12, and the insulating portion 13 can be also formed of a conductive material such as metal. However, it is necessary to provide a layer formed of the insulating material between the power supply terminal 31 and the insulating portion 13 or to form only the insulating portion 13 from the insulating material.

The heat radiating portion 10b has the flange 14, the loading portion 15, the heat radiating fins 16, and a projection portion 17.

The flange 14 has a plate shape. The flange 14 can have, for example, a disk shape. A distance between the outside surface of the flange 14 and the center axis 1a of the vehicle lighting device 1 is longer than a distance between the outside surface of the bayonet 12 and the center axis 1a of the vehicle lighting device 1. That is, the outside surface of the flange 14 is positioned on the outside of the vehicle lighting device 1 more than the outside surface of the bayonet 12.

The loading portion 15 can have a cylindrical shape. The loading portion 15 is provided on a surface 14a of the flange 14 on a side opposite to the side in which the heat radiating fins 16 are provided. A recessed portion 15a is provided on the side surface of the loading portion 15. The insulating portion 13 is provided on the inside of the recessed portion 15a. The light emitting module 20 (substrate 21) is provided on a surface 15b of the loading portion 15 on a side opposite to the flange 14 side.

The heat radiating fins 16 are provided on the surface 14b of the flange 14 on a side opposite to the side in which the loading portion 15 is provided. A plurality of heat radiating fins 16 can be provided. The plurality of heat radiating fins 16 can be provided in parallel to each other. The heat radiating fins 16 can have a plate shape.

The projection portion 17 has a function of protecting an end portion of the power supply terminal 31 and a function of holding a connector 105. The projection portion 17 is provided on the surface 14b of the flange 14 in which the heat radiating fins 16 are provided. The projection portion 17 can have a block shape. A recessed portion 17a is provided on an outside surface of the projection portion 17. The recessed portion 17a is opened on the outside surface of the projection portion 17.

A hole 17b is provided in the projection portion 17. The hole 17b penetrates between an end surface of the projection portion 17 on a side opposite to the flange 14 side and the surface 14a of the flange 14 on a side opposite to the side in which the heat radiating fins 16 are provided. The end portion of the power supply terminal 31 protrudes on the flange 14 side of the hole 17b. A part of the insulating portion 13 is exposed on the flange 14 side of the hole 17b. That is, an opening of the hole 17b on the flange 14 side is closed by the insulating portion 13. The hole 17b is not connected to the recessed portion 17a.

The connector 105 having a sealing member 105a is inserted into the hole 17b. Therefore, a cross section shape of the hole 17b is fitted to a cross section of the connector 105 having the sealing member 105a.

In addition, a cross section dimension of the hole 17b in a direction orthogonal to the center axis 1a of the vehicle lighting device 1 is slightly smaller than an external shape dimension of the sealing member 105a provided in a body of the connector 105. Therefore, when the connector 105 having the sealing member 105a is inserted into the hole 17b, the hole 17b is sealed to be water tightness.

The heat radiating portion 10b can be formed by integrally molding the flange 14, the loading portion 15, the heat radiating fins 16, and the projection portion 17 or can be formed by joining these members by individually forming these members. However, if the flange 14, the loading portion 15, the heat radiating fins 16, and the projection portion 17 are integrally molded, it is possible to improve the heat radiation property, to improve resistance against an external force, to achieve reduction in manufacturing cost, and the like.

The heat radiating portion 10b has a function of loading the light emitting module 20 and a function of discharging heat generated in the light emitting module 20 to the outside.

Therefore, it is preferable that the flange 14, the loading portion 15, the heat radiating fins 16, and the projection portion 17 are formed of a material having high thermal conductivity considering the function of discharging heat. The material having high thermal conductivity can be metal such as aluminum and aluminum alloy, ceramics such as aluminum oxide and aluminum nitride, resin having high thermal conductivity, or the like.

In this case, the material of the storage portion 10a and the material of the heat radiating portion 10b can be different from each other. For example, the storage portion 10a is formed of the insulating material such as resin and the heat radiating portion 10b can be formed of the material having high thermal conductivity such as metal (for example, aluminum alloy and the like).

Here, the mounting portion 11 is provided on a side of the flange 14 opposite to the side in which the heat radiating fins 16 are provided. In addition, the mounting portion 11 surrounds the loading portion 15. However, the mounting portion 11 does not surround the flange 14, the heat radiating fins 16, and the projection portion 17.

Therefore, it is possible to efficiently discharge heat generated in the light emitting module 20 to the outside via the flange 14, the heat radiating fins 16, and the projection portion 17 which are formed of a material having high thermal conductivity. That is, it is possible to improve the heat radiation property of the vehicle lighting device 1.

In addition, the heat radiating portion 10b is joined to the storage portion 10a. In this case, the insulating portion 13 of the storage portion 10a is inserted into the inside of the recessed portion 15a of the heat radiating portion 10b. The loading portion 15 of the heat radiating portion 10b is inserted into the inside of the mounting portion 11 of the storage portion 10a.

The storage portion 10a and the heat radiating portion 10b may be fitted into each other, or may be joined using adhesive and the like. The storage portion 10a and the heat radiating portion 10b may be joined by insert molding, or the storage portion 10a and the heat radiating portion 10b may be joined by heat welding.

Here, if the storage portion 10a and the heat radiating portion 10b are bonded, interface is formed between the storage portion 10a and the heat radiating portion 10b. If the interface is formed between the storage portion 10a and the heat radiating portion 10b, there is a concern that moisture enters from the interface. In this case, if the storage portion 10a and the heat radiating portion 10b are bonded and the like, it is possible to suppress entrance of moisture from the interface. However, it is difficult to completely sealing the interface.

In addition, in a case of the vehicle lighting device 1 provided in the automobile, a temperature of environment of use is −40° C. to 85° C. Therefore, even if initially it is water tightness, there is a concern that water tightness is lowered together with elapse of time by thermal stress generated by a difference in thermal expansion.

Thus, in the embodiment, the position of the end surface 11a of the mounting portion 11 on the flange 14 side and the position of the end surface 13a of the insulating portion 13 on the flange 14 side are on the light emitting module 20 side more than the position of the surface 14b of the flange 14.

In addition, an external dimension of the mounting portion 11 in a direction orthogonal to the center axis 1a of the vehicle lighting device 1 is smaller than an external dimension of the flange 14.

Therefore, as illustrated in FIG. 3, the interface between the mounting portion 11 and the flange 14 can be sealed by a sealing member 104.

Moreover, a part of the insulating portion 13 is exposed on the flange 14 side of the hole 17b. That is, the interface between the insulating portion 13 and the flange 14 is exposed on the inside of the hole 17b. However, the connector 105 having the sealing member 105a is inserted into the hole 17b.

Therefore, when the connector 105 having the sealing member 105a is inserted into the hole 17b, the hole 17b is sealed to be water tightness. As a result, it is possible to suppress that the moisture enters from the interface between the insulating portion 13 and the flange 14.

Moreover, the moisture is mainly on the outside of the housing 101 of a vehicle lamp 100. Therefore, moisture entering on the inside of the sealing member 104 from the inside of the housing 101 is little.

As described above, according to the vehicle lighting device 1 of the embodiment, it is possible to suppress that the moisture enters from the interface even if the storage portion 10a and the heat radiating portion 10b are bonded.

As illustrated in FIGS. 1 and 3, the light emitting module 20 is provided on the surface 15b of the loading portion 15 on the side opposite to the flange 14 side.

The light emitting module 20 has the substrate 21, a light emitting element 22, a resistor 23a (corresponding to an example of a first resistor), a resistor 23b (corresponding to an example of a second resistor), and a control portion 24.

The substrate 21 is provided on the surface 15b of the loading portion 15. The substrate 21 has a plate shape. A wiring pattern 26 is provided on the surface of the substrate 21.

A material or a structure of the substrate 21 is not particularly limited. For example, the substrate 21 can be formed of an inorganic material such as ceramics (for example, aluminum oxide, aluminum nitride, and the like), an organic material such as paper phenol and glass epoxy, and the like. In addition, the substrate 21 may be obtained by coating a surface of a metal plate with an insulating material. Moreover, in a case where the surface of the metal plate is coated with the insulating material, the insulating material may be formed of an organic material or may be formed of an inorganic material.

In a case where a heating value of the light emitting element 22 is large, it is preferable that the substrate 21 is formed by using a material having high thermal conductivity in terms of heat radiation. As the material having high thermal conductivity, ceramics such as aluminum oxide or aluminum nitride, resin having high thermal conductivity, a material that is obtained by coating a surface of a metal plate with an insulating material, and the like can be exemplified.

In addition, the substrate 21 may be a single layer or may be a multi-layer.

The light emitting element 22 is provided on the substrate 21. The light emitting element 22 is electrically connected to the wiring pattern 26 provided on the surface of the substrate 21. The light emitting element 22 can be, for example, a light emitting diode, an organic light emitting diode, a laser diode, and the like.

A form of the light emitting element 22 is not particularly limited.

The light emitting element 22 can be a light emitting element of a surface mounting type such as Plastic Leaded Chip Carrier (PLCC) type. Moreover, the light emitting element 22 illustrated in FIGS. 1 and 3 is the light emitting element of the surface mounting type.

The light emitting element 22 can be, for example, a light emitting element having a lead wire of a shell type and the like.

In addition, the light emitting element 22 can be mounted by Chip On Board (COB). In a case of the light emitting element 22 that is mounted by the COB, it is possible to provide the light emitting element 22 of a chip shape, wiring electrically connecting the light emitting element 22 and the wiring pattern 26, a frame-like member surrounding the light emitting element 22 and the wiring, a sealing portion provided on an inside of the frame-like member, and the like on the substrate 21.

In this case, the sealing portion can include a phosphor. The phosphor can be, for example, a YAG-based phosphor (yttrium-aluminum-garnet based fluorescent material). For example, if the light emitting element 22 is a blue light emitting diode and the phosphor is the YAG-based phosphor, the YAG-based phosphor is excited by blue light emitted from the light emitting element 22 and yellow fluorescence is emitted from the YAG-based phosphor. Then, white light is emitted from the vehicle lighting device 1 by mixing blue light and yellow light. Moreover, types of the phosphors and types of the light emitting elements 22 are not limited to the examples described above. The types of the phosphors and the types of the light emitting elements 22 can be appropriately changed such that a desired emitting color is obtained in accordance with the application of the vehicle lighting device 1 and the like.

A light emitting surface of the light emitting element 22 faces a front side of the vehicle lighting device 1. The light emitting element 22 mainly emits light on the front side of the vehicle lighting device 1.

The number, sizes, and arrangements of the light emitting elements 22 are not limited to the examples described above, and can be appropriately changed in accordance with the size and the application of the vehicle lighting device 1, and the like.

Here, as illustrated in FIG. 1, a plurality of light emitting elements 22 are provided side by side in a row in the X direction. As described above, the X direction is the direction that is the horizontal direction when attaching the vehicle lighting device 1 to the vehicle lamp 100. The Z direction is the direction that is the vertical direction when attaching the vehicle lighting device 1 to the vehicle lamp 100. In addition, a dimension of the row of the light emitting elements 22 in the X direction is longer than a dimension of the row of the light emitting elements 22 in the Z direction.

Therefore, light distribution characteristics of the vehicle lighting device 1 are wide in the horizontal direction and are narrow in the vertical direction. That is, the vehicle lighting device 1 can have the light distribution characteristics for vehicle which are wide in the horizontal direction and are narrow in the vertical direction.

The resistors 23a and 23b are provided on the substrate 21. The resistors 23a and 23b are electrically connected to the wiring pattern 26 provided on the surface of the substrate 21. The resistors 23a and 23b controls a current flowing through the light emitting element 22.

Since there are variations in forward voltage characteristics of the light emitting element 22, if an applied voltage between an anode terminal and a ground terminal is constant, variations occur in brightness (luminous flux, luminance, luminous intensity, and illuminance) of the light emitting element 22. Therefore, a value of the current flowing through the light emitting element 22 is made to fall within a predetermined range by the resistors 23a and 23b so that the brightness of the light emitting element 22 falls within a predetermined range. In this case, a value of the current flowing through the light emitting element 22 can be within a predetermined range by changing resistance values of the resistors 23a and 23b.

The resistors 23a and 23b can be, for example, resistors of a surface mounting type, resistors (metal oxide film resistor) having a lead wire, film-like resistors formed using a screen printing method, and the like. Moreover, the resistors 23a and 23b illustrated in FIGS. 1 and 3 are the film-like resistors.

The number, sizes, and arrangements of the resistors 23a and 23b are not limited to the examples described above, and can be appropriately changed in accordance with the number and a specification of the light emitting element 22, and the like.

The control portion 24 is provided on the substrate 21. The control portion 24 is electrically connected to the wiring pattern 26 provided on the surface of the substrate 21. Moreover, details regarding connection between the light emitting element 22, the resistors 23a and 23b, the control portion 24, and the like will be described later (see FIG. 6A and the like).

In addition, it is possible to provide diodes to prevent a reverse voltage from being applied to the light emitting element 22 and to prevent pulse noise from a reverse direction from being applied to the light emitting element 22.

In addition, it is also possible to provide a pull-down resistor to detect disconnection of the light emitting element 22, to prevent erroneous lighting, and the like. In addition, it is also possible to provide a cover portion for covering the wiring pattern 26, the film-like resistor, and the like. The cover portion can include, for example, a glass material.

The power supplying portion 30 has a plurality of power supply terminals 31. The plurality of power supply terminals 31 are provided on the inside of the socket 10 (insulating portion 13). The plurality of power supply terminals 31 extend on the inside of the insulating portion 13. One-side end portion of the plurality of power supply terminals 31 protrudes from an end surface of the insulating portion 13 on a side opposite to the flange 14 side and is electrically connected to the wiring pattern 26 provided in the substrate 21. The other end portion of the plurality of power supply terminals 31 protrudes from the end surface 13a of the insulating portion 13 on the flange 14 side. The other end portion of the plurality of power supply terminals 31 is exposed on the inside of the hole 17b. The number and a shape of the power supply terminals 31, and the like are not limited to the examples described above, and can be appropriately changed.

In addition, the power supplying portion 30 can include a substrate (not illustrated), circuit components (for example, integrated circuit, capacitors, and the like), and the like. Moreover, the substrate (not illustrated), the circuit components, and the like can be provided on the inside of the storage portion 10a, the inside of the heat radiating portion 10b, and the like.

Next, the light emitting module 20 will be further described.

First, light emitting modules 200 and 210 according to a comparison example will be described.

Figure 4A:
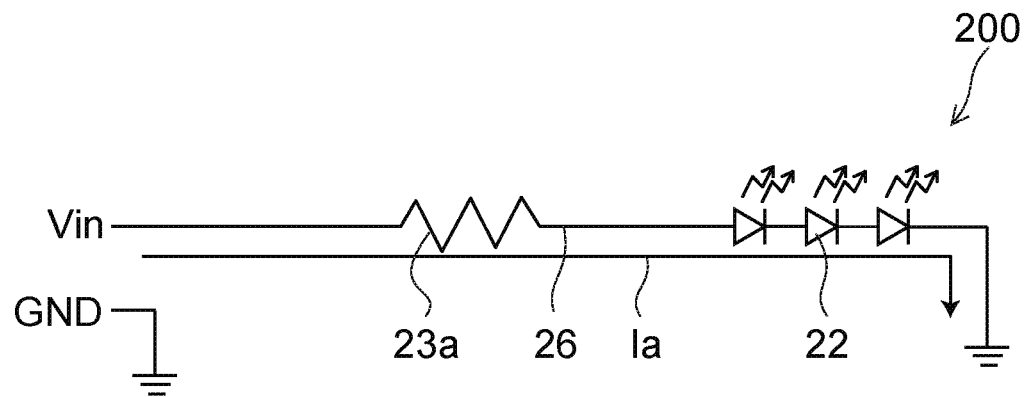
FIG. 4A is a circuit diagram illustrating a light emitting module 200 according to a comparison example.

FIG. 4A is a circuit diagram illustrating the light emitting module 200 according to the comparison example.

Figure 4B:
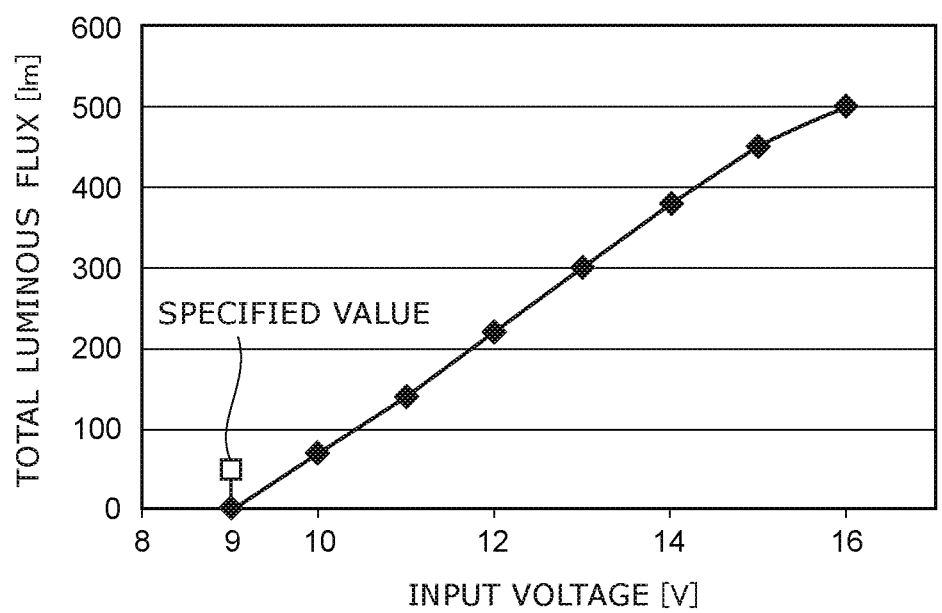
FIG. 4B is a graph illustrating a relationship between an input voltage and a total luminous flux in the light emitting module 200.

FIG. 4B is a graph illustrating a relationship between an input voltage and a total luminous flux in the light emitting module 200.

As illustrated in FIG. 4A, the light emitting module 200 is provided with light emitting elements 22 and a resistor 23a. Similar to the light emitting module 20 described above, the light emitting elements 22 and the resistor 23a are electrically connected to a wiring pattern 26 provided on a surface of a substrate 21. However, the light emitting module 200 is not provided with a control portion 24.

Here, in a vehicle lighting device 1, a battery is power supply, but a voltage applied to the vehicle lighting device 1 fluctuates.

For example, an operation standard voltage (rated voltage) of the vehicle lighting device 1 for a general automobile is approximately 13.5 V. However, the voltage applied to the vehicle lighting device 1 fluctuates due to a voltage drop of the battery, an operation of an alternator, an influence of a circuit, and the like.

Therefore, in the vehicle lighting device 1 for an automobile, an operating voltage range (voltage fluctuation range) is determined. For example, the operating voltage range is generally equal to or greater than 9 V and equal to or less than 16 V, and may also be equal to or greater than 7 V and equal to or less than 16 V in some case.

Here, the light emitting element 22 has a voltage drop in a forward direction. Therefore, as illustrated in FIG. 4B, when the input voltage (applied voltage) of the plurality of light emitting elements 22 which are connected in series decreases, an amount of light emitted from the plurality of light emitting elements 22 decreases. Therefore, in the vicinity of a lower limit of the operating voltage range, there is a concern that the total luminous flux of the vehicle lighting device 1 is less than a specified value.

For example, in a case where the voltage drop of the light emitting elements 22 in the forward direction is approximately 3 V, if three light emitting elements 22 are connected in series, the voltage drop of 9 V generates. In addition, the resistor 23a is connected in series to the three light emitting elements 22. Therefore, when the input voltage is approximately 9 V, almost no current flows through the three light emitting elements 22 and the total luminous flux of the vehicle lighting device 1 is less than the specified value.

Figure 5A:
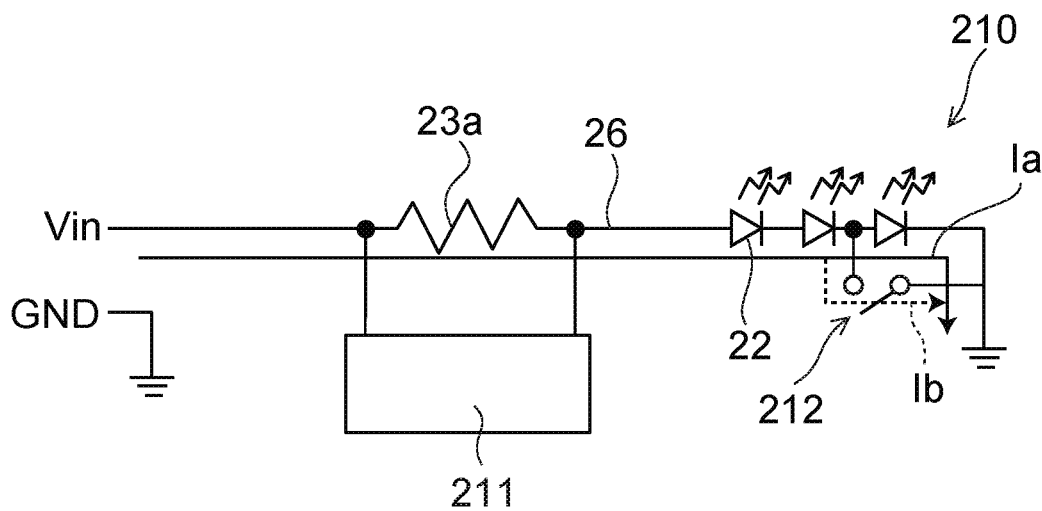
FIG. 5A is a circuit diagram illustrating a light emitting module 210 according to a comparison example.

FIG. 5A is a circuit diagram illustrating a light emitting module 210 according to a comparison example.

Figure 5B:
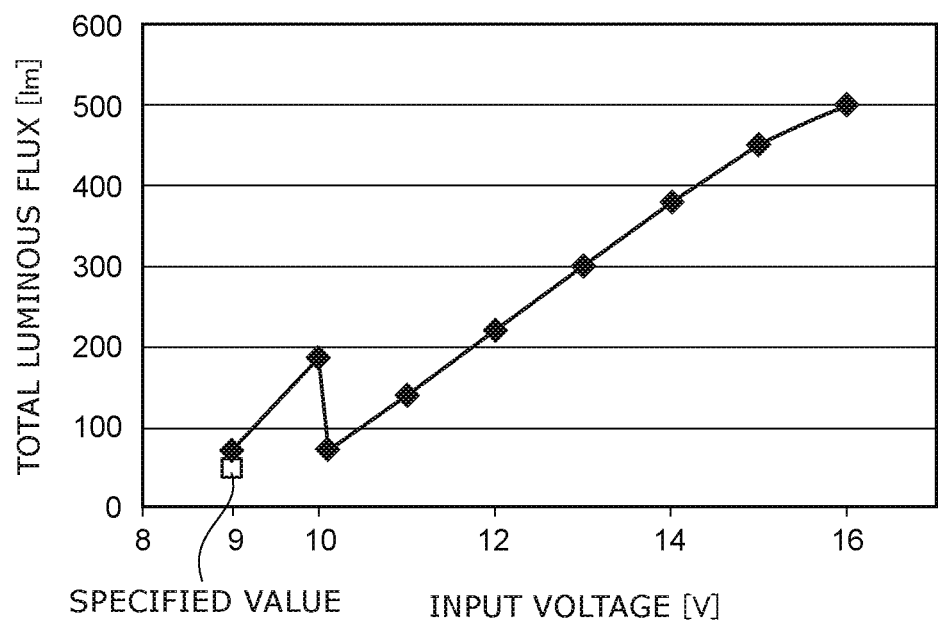
FIG. 5B is a graph illustrating a relationship between an input voltage and a total luminous flux in the light emitting module 210.

FIG. 5B is a graph illustrating a relationship between an input voltage and a total luminous flux in the light emitting module 210.

As illustrated in FIG. 5A, the light emitting module 210 is provided with the light emitting elements 22, a resistor 23a, a voltmeter 211, and a switch 212.

The voltmeter 211 is connected in parallel to the resistor 23a. The voltmeter 211 measures the input voltage.

The three light emitting elements 22 are electrically connected in series to the resistor 23a.

The switch 212 is connected in parallel to one light emitting element 22 farthest from the inside side.

In a case where the input voltage measured by the voltmeter 211 exceeds a predetermined value, the switch 212 is opened. Then, a current Ia flows through the three light emitting elements 22 connected in series to each other and light is emitted from the three light emitting elements 22.

On the other hand, in a case where the input voltage measured by the voltmeter 211 is the predetermined value, the switch 212 is closed. Then, a current Ib flows through the two light emitting elements 22 connected in series to each other and almost no current flows through the light emitting elements 22 connected in parallel to the switch 212. Therefore, the current flowing through two light emitting elements 22 can be increased. As a result, it is possible to suppress the total luminous flux of the vehicle lighting device 1 is less than the specified value in the vicinity of a lower limit of operating voltage range.

However, if the switch 212 is closed, the current flowing through the two light emitting elements 22 rapidly increases. Therefore, as illustrated in FIG. 5B, a new problem that the total luminous flux of the vehicle lighting device 1 rapidly increases in the vicinity of the lower limit of the operating voltage range.

Figure 6A:
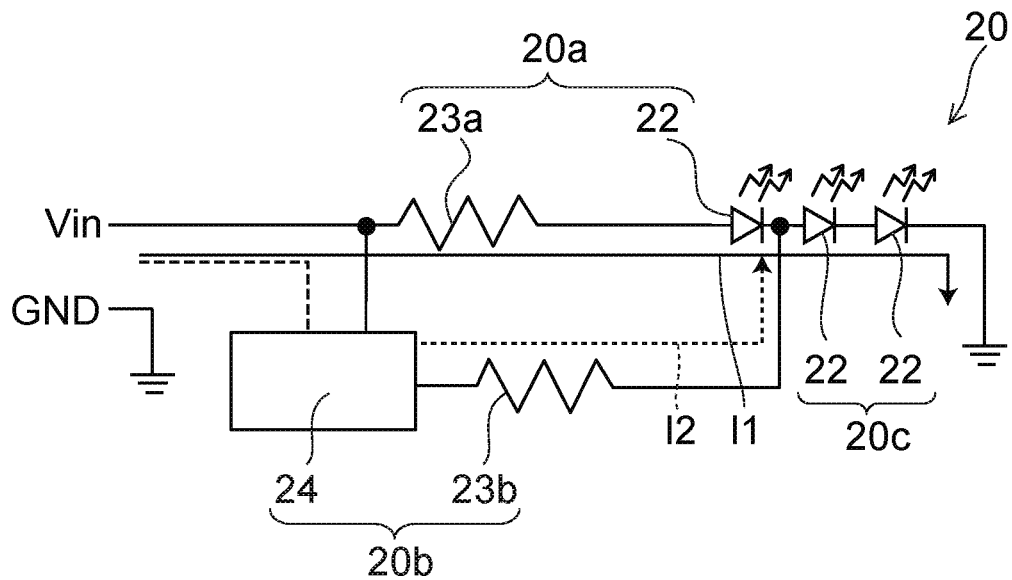
FIG. 6A is a circuit diagram illustrating a light emitting module 20 according to an embodiment.

FIG. 6A is a circuit diagram illustrating a light emitting module 20 according to an embodiment.

Figure 6B:
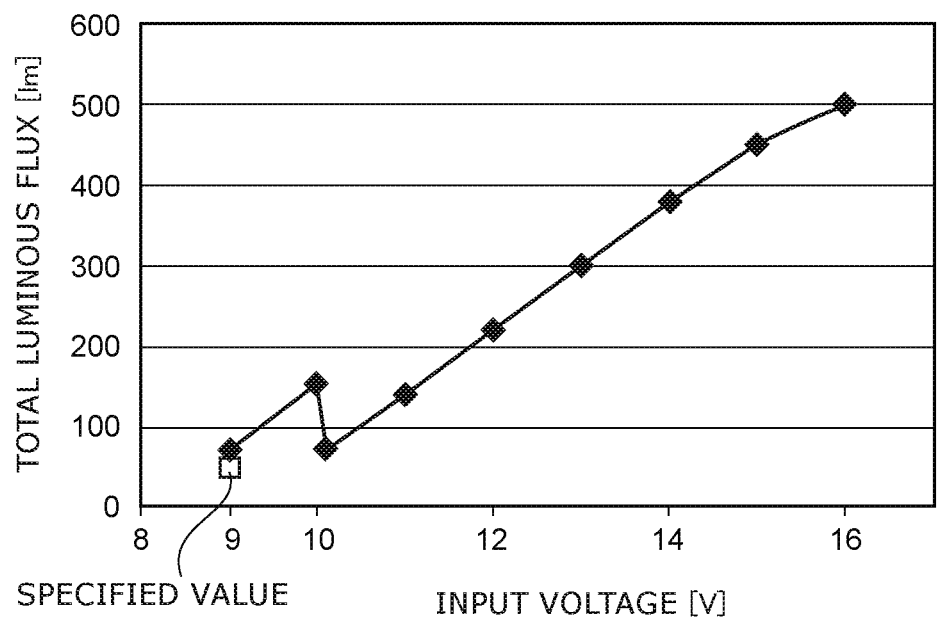
FIG. 6B is a graph illustrating a relationship between an input voltage and a total luminous flux in the light emitting module 20.

FIG. 6B is a graph illustrating a relationship between an input voltage and a total luminous flux in the light emitting module 20.

As illustrated in FIG. 6A, the light emitting module 20 has a first circuit portion 20a, a second circuit portion 20b, and a third circuit portion 20c.

The first circuit portion 20a has at least one light emitting element 22 and a resistor 23a connected in series to the light emitting element 22. Moreover, in a case where a plurality of light emitting elements 22 are provided, the plurality of light emitting elements 22 and the resistor 23a are connected in series.

The second circuit portion 20b is connected in parallel to the first circuit portion 20a. The second circuit portion 20b has at least a control portion 24. Moreover, in a case where the control portion 24 and a resistor 23b are provided, the control portion 24 and the resistor 23b are connected in series.

The third circuit portion 20c is connected in series to the first circuit portion 20a and the second circuit portion 20b. The third circuit portion 20c has at least one light emitting element 22. Moreover, in a case where a plurality of light emitting elements 22 are provided, the plurality of light emitting elements 22 are connected in series.

The control portion 24 measures an input voltage and in a case where the measured input voltage is a predetermined value, a current I2 flows through the second circuit portion 20b. The control portion 24 has a function of measuring the input voltage and a function of switch for switching ON and OFF of the current I2. For example, the control portion 24 can perform the measurement of the input voltage by providing an input voltage determination circuit using a Zener diode (constant voltage diode), a comparator using an operational amplifier, or the like. In addition, for example, it is possible to switch ON and OFF of the current I2 flowing through the second circuit portion 20b by providing a switching transistor or the like in the control portion 24.

In a case where the measured input voltage exceeds a predetermined value, the control portion 24 prevents the current I2 from flowing through the second circuit portion 20b. For example, the control portion 24 causes the built-in switching transistor to be in an OFF state. Then, the current I1 flows through all the light emitting elements 22 connected in series and light is emitted from all the light emitting elements 22.

On the other hand, in a case where the measured input voltage is the predetermined value, the control portion 24 causes the current I2 to flow through the second circuit portion 20b. For example, the control portion 24 causes the built-in switching transistor to be in an ON state. Then, a current that is obtained by adding the current I1 from the first circuit portion 20a to the current I2 from the second circuit portion 20b flows through the plurality of light emitting elements 22 provided in the third circuit portion 20c. In addition, the current I1 flows through the light emitting element 22 provided in the first circuit portion 20a. As a result, it is possible to prevent the total luminous flux of the vehicle lighting device 1 from being less than the specified value in the vicinity of a lower limit of operating voltage range.

In this case, it is possible to control a value of the current I2 by adjusting a resistance value of the resistor 23b. Therefore, it is possible to suppress the current flowing through the plurality of light emitting elements 22 provided in the third circuit portion 20c rapidly increases when the control portion 24 causes the current I2 to flow through the second circuit portion 20b. Therefore, as illustrated in FIG. 6B, it is possible to suppress the total luminous flux of the vehicle lighting device 1 rapidly increases in the vicinity of a lower limit of operating voltage range.

That is, according to the vehicle lighting device 1 of the embodiment, even in a case where a voltage applied to the vehicle lighting device 1 decreases, it is possible to secure a required total luminous flux and to suppress fluctuation of the total luminous flux.

Moreover, in a film-like resistor, adjustment of the resistance value can be easily adjusted. Therefore, it is preferable that the resistor 23b is the film-like resistor. In this case, the adjustment of the resistance value can be performed as follows. First, the film-like resistor (resistor 23b) is formed on a surface of a substrate 21 using screen printing method or the like. Next, a part of the resistor 23b is removed by irradiating the resistor 23b with laser light. Then, the resistance value of the resistor 23b is changed by a size of a removed portion or the like. In this case, if a part of the resistor 23b is removed, the resistance value increases.

Moreover, in the light emitting module 210 according to the comparison example described above, if a resistor is connected in series to the switch 212, when the switch 212 is closed, a current flows through the light emitting element 22 connected in parallel to the switch 212 and there is a concern that the current flowing through remaining two light emitting elements 22 decreases. Therefore, there is a concern that the required total luminous flux cannot be secured.

Figure 7:
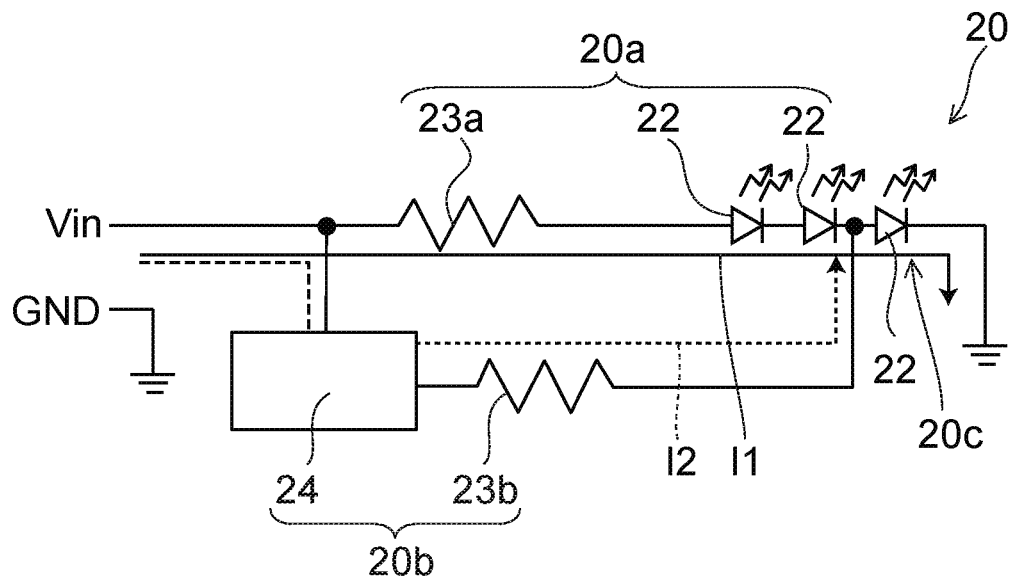
FIG. 7 is a circuit diagram illustrating a light emitting module 20 according to another embodiment.

FIG. 7 is a circuit diagram illustrating a light emitting module 20 according to another embodiment.

As illustrated in FIG. 7, the light emitting module 20 has a first circuit portion 20a, a second circuit portion 20b, and a third circuit portion 20c.

As described above, the first circuit portion 20a may have at least one light emitting element 22 and a resistor 23a that is connected in series to the light emitting element 22. For example, in a case of the example illustrated in FIG. 6A, the first circuit portion 20a has one light emitting element 22 and the resistor 23a connected in series to the light emitting element 22. In a case of the example illustrated in FIG. 7, the first circuit portion 20a has two light emitting elements 22 connected in series and the resistor 23a.

In addition, the third circuit portion 20c may have at least one light emitting element 22. For example, in a case of the example illustrated in FIG. 6A, the third circuit portion 20c has the two light emitting elements 22 connected in series. In a case of the example illustrated in FIG. 7, the third circuit portion 20c has one light emitting element 22.

In this case, if the number of the light emitting elements 22 provided in the third circuit portion 20c is reduced, a voltage value (determination reference) using when performing determination whether or not the current I2 flows through the second circuit portion 20b can be reduced.

Here, as illustrated in FIG. 6B, if the current I2 flows through the second circuit portion 20b, the total luminous flux increases. Therefore, as frequency of flowing of the current I2 through the second circuit portion 20b increases, the number of times of increasing in the total luminous flux increases accordingly. When the number of times of increasing in the total luminous flux increases, there is a concern that a feeling of strangeness may occur.

According to the embodiment, the voltage value that is the determination reference can be reduced. Therefore, it is possible to reduce the number of times of flowing of the current I2 through the second circuit portion 20b. As a result, since the number of times of increasing the total luminous flux can be reduced, it is possible to suppress occurrence of the feeling of strangeness.

Figure 8:
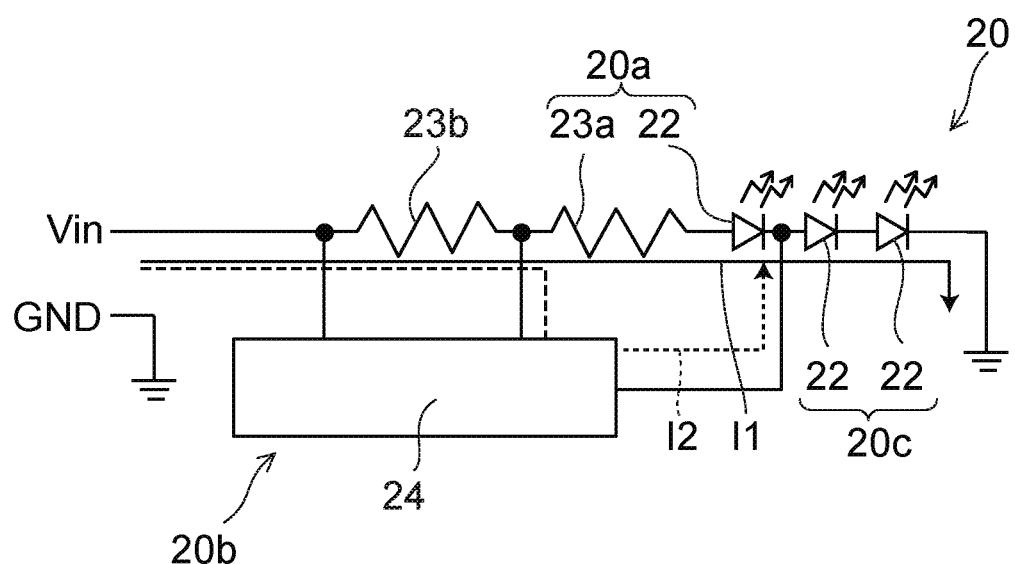
FIG. 8 is a circuit diagram illustrating a light emitting module 20 according to still another embodiment.

FIG. 8 is a circuit diagram illustrating a light emitting module 20 according to another embodiment.

As illustrated in FIG. 8, the light emitting module 20 has a first circuit portion 20a, a second circuit portion 20b, a third circuit portion 20c, and a resistor 23b (corresponding to an example of a third resistor).

The second circuit portion 20b is connected in parallel to the first circuit portion 20a. The third circuit portion 20c is connected in series to the first circuit portion 20a and the second circuit portion 20b. The resistor 23b is connected in series to the first circuit portion 20a and the second circuit portion 20b.

As described above, the second circuit portion 20b may have at least a control portion 24. For example, in cases of the examples illustrated in FIG. 6A and FIG. 7, the second circuit portion 20b has the control portion 24 and the resistor 23b connected in series. In the embodiment, the second circuit portion 20b has the control portion 24.

In this case, the resistor 23a and the resistor 23b cooperate to control the current I1 flowing through all the light emitting elements 22. The resistor 23b controls the current I2 flowing through the light emitting elements 22 provided in the third circuit portion 20c.

The effect described above can also be enjoyed by the embodiment. That is, even in a case where the voltage applied to the vehicle lighting device 1 decreases, it is possible to secure the required total luminous flux and to suppress fluctuation of the total luminous flux.

Figure 9A:
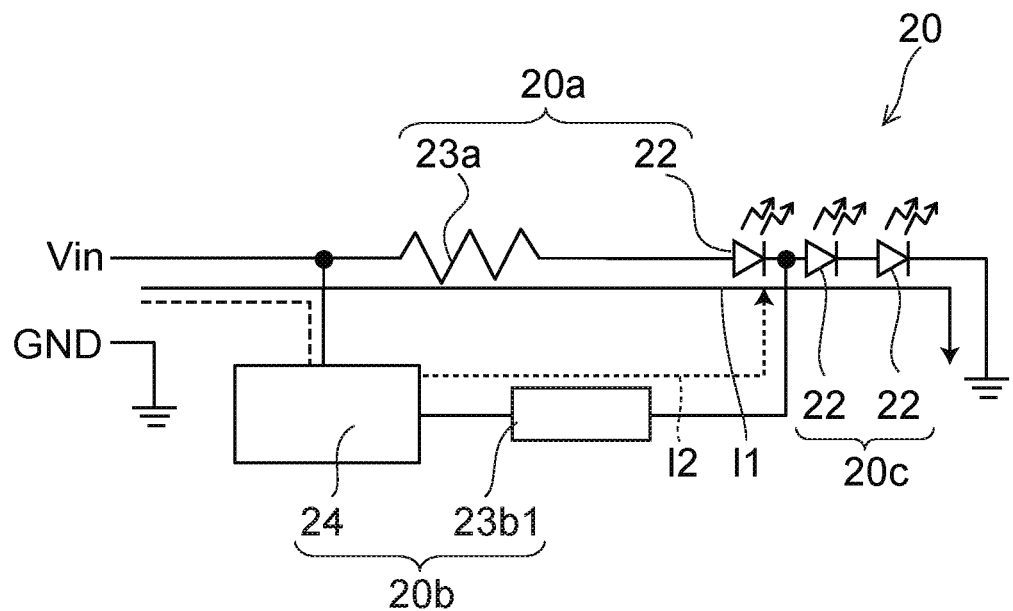
FIG. 9A is a circuit diagram illustrating a light emitting module 20 according to still another embodiment.

FIG. 9A is a circuit diagram illustrating a light emitting module 20 according to another embodiment.

Figure 9B:
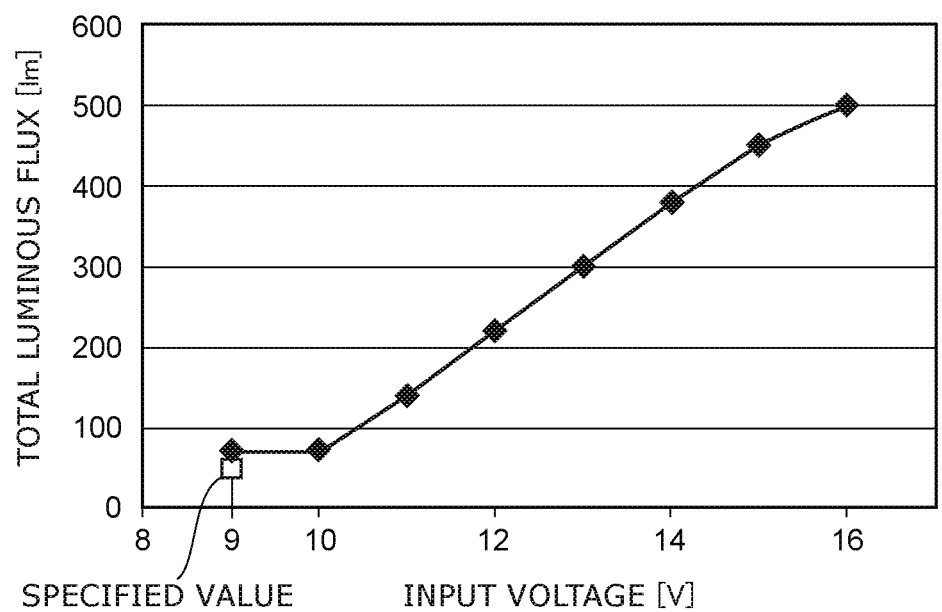
FIG. 9B is a graph illustrating a relationship between an input voltage and a total luminous flux in the light emitting module 20.

FIG. 9B is a graph illustrating a relationship between an input voltage and a total luminous flux in the light emitting module 20.

As illustrated in FIG. 9A, the light emitting module 20 has a first circuit portion 20a, a second circuit portion 20b, and a third circuit portion 20c.

As described above, the second circuit portion 20b may have at least a control portion 24. In cases of the examples illustrated in FIG. 6A and FIG. 7, the second circuit portion 20b has the control portion 24 and the resistor 23b connected in series. In the embodiment, the second circuit portion 20b has a control portion 24 and a constant current circuit 23b1 connected in series. That is, in the embodiment, the second circuit portion 20b has the constant current circuit 23b1 instead of a resistor 23b.

The constant current circuit 23b1 can be, for example, a constant current circuit using a constant current diode, a current limiter circuit using a transistor, a constant current IC, or the like.

As described above, if a current I2 flows through the second circuit portion 20b, the total luminous flux increases (see FIG. 6B). In this case, if an amount of increase of the total luminous flux becomes too large, there is a concern that the feeling of strangeness occurs.

According to the embodiment, a value of the current I2 flowing through the second circuit portion 20b can be constant by the constant current circuit 23b1. Therefore, as illustrated in FIG. 9B, it is possible to suppress an increase in the total luminous flux of the vehicle lighting device 1 in the vicinity of the lower limit of operating voltage range.

Figure 10A:
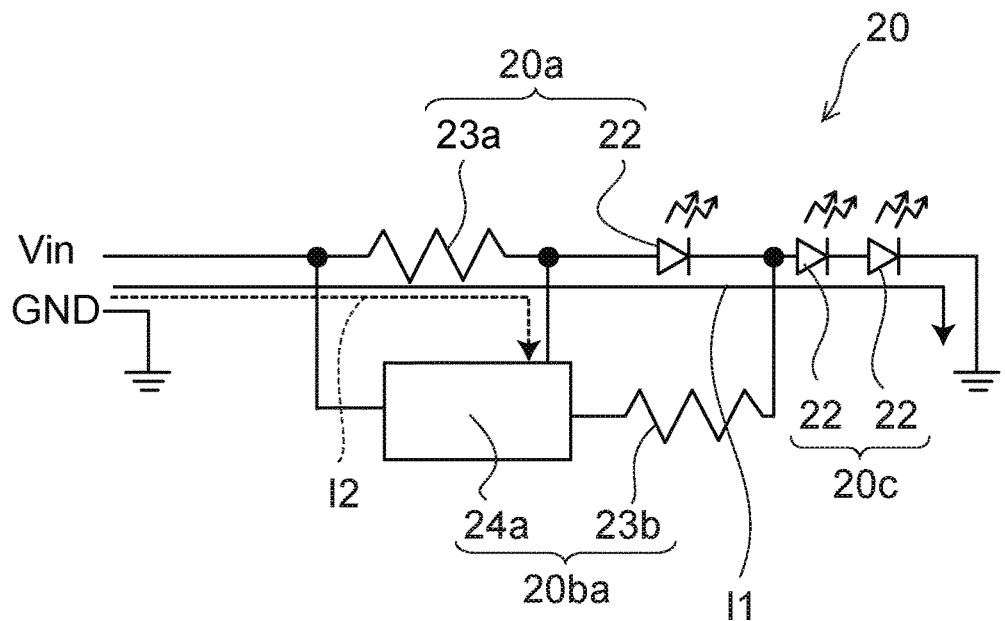
FIGS. 10A and 10B are circuit diagrams illustrating a light emitting module 20 according to still another embodiment.
Figure 10B:
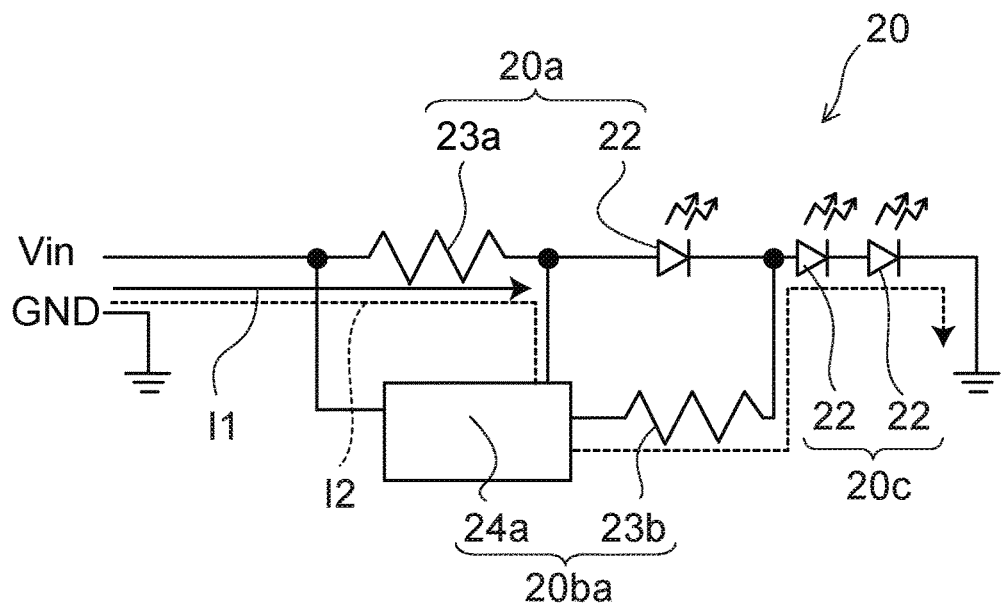

FIGS. 10A and 10B are circuit diagrams illustrating a light emitting module 20 according to another embodiment.

As illustrated in FIGS. 10A and 10B, the light emitting module 20 has a first circuit portion 20a, a second circuit portion 20ba, and a third circuit portion 20c.

The second circuit portion 20ba has a control portion 24a and a resistor 23b connected in series to the control portion 24a. In addition, the control portion 24a is connected in parallel to a resistor 23a.

The control portion 24 described above has the function of measuring the input voltage and the function of the switch for switching ON and OFF of the current I2. In contrast, the control portion 24a has a function of measuring the input voltage, a function of a switch for switching ON and OFF of the current I2, and a function of a switch for switching ON and OFF of a current I1. That is, the control portion 24a further has the function of the switch for switching ON and OFF of the current I1. For example, the control portion 24a can have switching transistors for switching ON and OFF of the current I1 and the current I2, and the like. Moreover, the function of measuring the input voltage can be, for example, similar to the control portion 24.

A resistance value of the resistor 23a is adjusted so that a value A of the current I1. (value A of the current I1. flowing through the resistor 23a) flowing through the light emitting elements 22 provided in the first circuit portion 20a and the third circuit portion 20c is within a predetermined range.

The resistance value of the resistor 23b is adjusted so that a value B (value B of the current I2 flowing through the resistor 23b) of the current I2 flowing through the light emitting elements 22 provided in the third circuit portion 20c is within a predetermined range.

Here, the resistance value of the resistor 23b is adjusted so that the value B of the current I2 satisfies the following expression (1).

$$(Na/Nb) \times A \times 0.95 \leq B \leq (Na/Nb) \times A \times 1.05 \quad (1)$$

Moreover, A is a value of the current I1 flowing through the resistor 23a, B is a value of current flowing through the resistor 23b, Na is the number of the light emitting elements 22 provided in the first circuit portion 20a and the third circuit portion 20c, and Nb is the number of the light emitting elements 22 provided in the third circuit portion 20c.

For example, in a case where Na is 3, Nb is 2, the value A of the current I1 is 100 mA (milliamperes), the resistance value of the resistor 23b is adjusted so that the value B of the current I2 becomes 142.5 mA (milliamperes)≤B≤157.5 mA (milliamperes).

Next, an operation of the control portion 24a will be described.

First, the control portion 24a measures the input voltage.

In a case where a measured input voltage exceeds a predetermined value, as illustrated in FIG. 10A, the control portion 24a causes the current I2 to flow through the second circuit portion 20ba. For example, the control portion 24a prevents the current I2 from flowing through the second circuit portion 20ba by a built-in switching transistor.

In this case, the control portion 24a causes the current I1 to flow through the first circuit portion 20a and the third circuit portion 20c. For example, the control portion 24a causes the current I1 to flow through the first circuit portion 20a and the third circuit portion 20c by the built-in switching transistor.

Then, the current I1 flows through all the light emitting elements 22 connected in series and light is emitted from all the light emitting elements 22.

In a case where the measured input voltage is a predetermined value, as illustrated in FIG. 10B, the control portion 24a prevents the current I1 from flowing through the light emitting element 22 provided in the first circuit portion 20a. For example, the control portion 24a prevents the current I1 from flowing through the light emitting element 22 provided in the first circuit portion 20a by the built-in switching transistor.

In this case, the control portion 24a causes the current I2 to flow through the second circuit portion 20ba. For example, the control portion 24a causes the current I2 to flow through the second circuit portion 20ba by the built-in switching transistor.

Then, the current I2 from the second circuit portion 20ba flows through only the light emitting elements 22 provided in the third circuit portion 20c.

Here, it is considered that the luminous flux of light emitted from the light emitting elements 22 is substantially proportional to the value of the current flowing through the light emitting element 22.

Therefore, if the expression (1) is satisfied, the total luminous flux in a case where the current I1 flows through all the light emitting elements 22 provided in the first circuit portion 20a and the third circuit portion 20c, and the total luminous flux in a case where the current I2 flows through the light emitting elements 22 provided in the third circuit portion 20c can be substantially equal to each other as seen with a naked eye during switching when the input voltage is a predetermined value.

On the other hand, in a case where the value B of the current I2 is smaller than (Na/Nb)×A×0.95 or is greater than (Na/Nb)×A×1.05, fluctuation of the total luminous flux increases as seen with the naked eye when the input voltage is the predetermined value, and a feeling of strangeness may occur.

Therefore, even in a case where the voltage applied to the vehicle lighting device 1 decreases, it is possible to secure the required total luminous flux and the fluctuation of the total luminous flux can be made gentle.

Figure 11A:
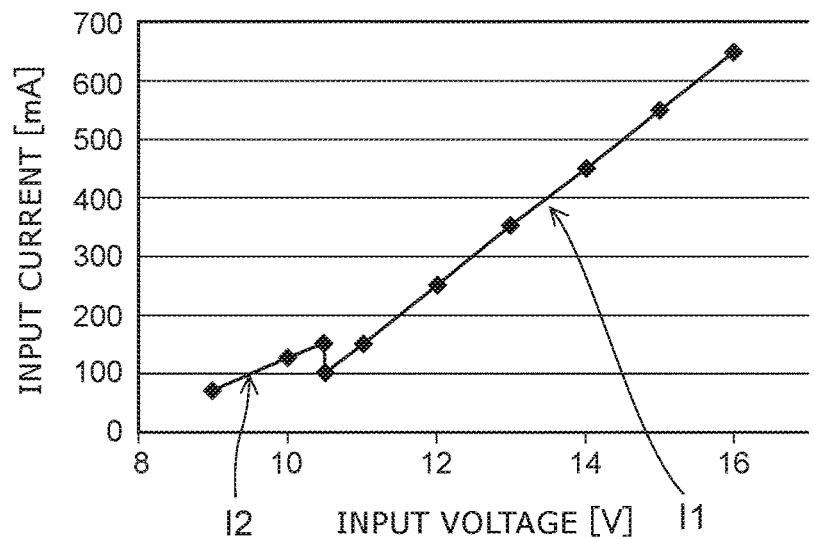
FIG. 11A is a graph illustrating a relationship between an input voltage and an input current in the light emitting module 20.

FIG. 11A is a graph illustrating a relationship between an input voltage and an input current in the light emitting module 20.

Figure 11B:
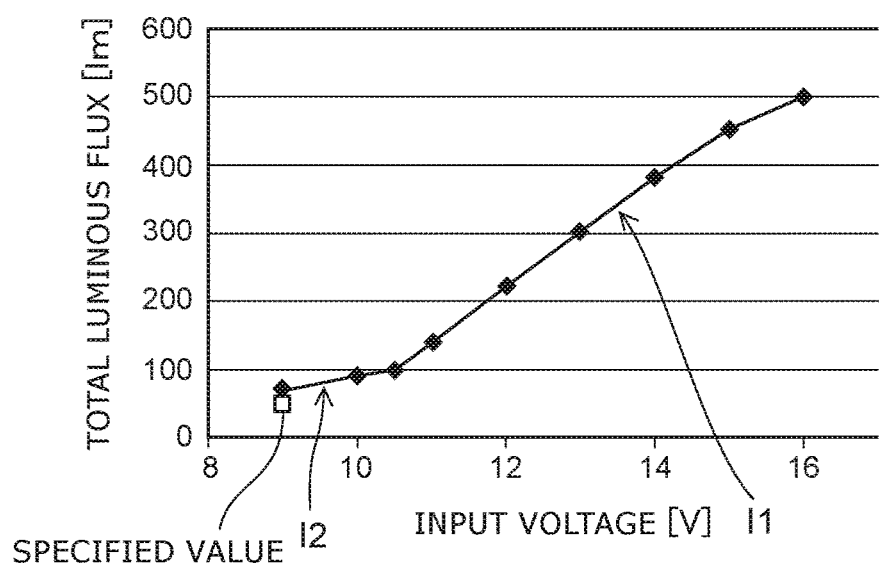
FIG. 11B is a graph illustrating a relationship between the input voltage and a total luminous flux in the light emitting module 20.

FIG. 11B is a graph illustrating a relationship between the input voltage and the total luminous flux in the light emitting module 20.

As described above, the value B of the current I2 satisfies the expression (1).

Therefore, as illustrated in FIG. 11A, when the control portion 24a causes the current I2 to flow through only the light emitting elements 22 provided in the third circuit portion 20c, the current flowing through the light emitting elements 22 provided in the third circuit portion 20c rapidly increases.

However, when the expression (1) is satisfied, the total luminous flux in a case where the current I1 flows through all the light emitting elements 22 provided in the first circuit portion 20a and the third circuit portion 20c, and the total luminous flux in a case where the current I2 flows through only the light emitting elements 22 provided in the third circuit portion 20c can be substantially equal to each other.

Therefore, as illustrated in FIG. 11B, it is possible to prevent the total luminous flux of the vehicle lighting device 1 from rapidly increasing in the vicinity of the lower limit of operating voltage range.

Next, the vehicle lamp 100 is exemplified.

Moreover, hereinafter, as an example, a case of a front combination light in which the vehicle lamp 100 is provided in the automobile will be described. However, the vehicle lamp 100 is not limited to the front combination light provided in the automobile. The vehicle lamp 100 may be a vehicle lamp provided in an automobile, a railway vehicle, and the like.

FIG. 12 is a partial sectional view schematically illustrating the vehicle lamp 100.

As illustrated in FIG. 12, the vehicle lighting device 1, the housing 101, a cover 102, an optical element portion 103, the sealing member 104, and the connector 105 are provided in the vehicle lamp 100.

The housing 101 has a box shape of which one end portion is opened. The housing 101 can be formed of, for example, resin and the like through which light is not transmitted. The attachment hole 101a into which a portion of the mounting portion 11 in which the bayonets 12 are provided is inserted is provided in a bottom surface of the housing 101. Recessed portions into which the bayonets 12 provided in the mounting portion 11 are inserted are provided in a periphery of the attachment hole 101a. Moreover, a case where the attachment hole 101a is directly provided in the housing 101 is exemplified, but an attaching member having the attachment hole 101a may be provided in the housing 101.

When attaching the vehicle lighting device 1 to the vehicle lamp 100, portions of the mounting portion 11 in which the bayonets 12 are provided are inserted into the attachment holes 101a and the vehicle lighting device 1 is rotated. Then, the bayonets 12 are held by the recessed portions provided on the periphery of the attachment hole 101a. Such an attaching method is called a twist-lock.

When attaching the vehicle lighting device 1 to the vehicle lamp 100, the vehicle lighting device 1 is attached in the direction illustrated in FIG. 1.

That is, the plurality of light emitting elements 22 are provided side by side in a row in the X direction (horizontal direction). Therefore, it is possible to obtain the light distribution characteristics for vehicle which are wide in the horizontal direction and are narrow in the vertical direction.

In addition, as illustrated in FIG. 2, the plurality of power supply terminals 31 are provided side by side in a row in the Z direction (vertical direction). The plurality of heat radiating fins 16 are provided side by side in a row in the X direction (horizontal direction). The heat radiating fins 16 have the shape extending straightly in the Z direction (vertical direction). Therefore, the flow of a rising air flow 300 in the region in which the plurality of heat radiating fins 16 are provided can be prevented from being hindered by the projection portion 17, the connector 105, and the heat radiating fins 16.

As described above, the vehicle lighting device 1 has the light distribution characteristics for vehicle which are wide in the horizontal direction and are narrow in the vertical direction, and it is possible to improve the heat radiation.

The cover 102 is provided so as to close an opening of the housing 101. The cover 102 can be formed of resin and the like having a light-transmitting property. The cover 102 can have functions of a lens and the like.

Light emitted from the vehicle lighting device 1 is incident on the optical element portion 103. The optical element portion 103 performs reflection, diffusion, guiding, and condensing of the light emitted from the vehicle lighting device 1, formation of a predetermined light distribution pattern, and the like.

For example, the optical element portion 103 illustrated in FIG. 12 is a reflector. In this case, the optical element portion 103 reflects the light emitted from the vehicle lighting device 1, and causes the predetermined light distribution pattern to be formed. If the optical element portion 103 is the reflector, the optical element portion 103 can be provided on the inside of the housing 101 so as to be coaxially with the center axis of the attachment hole 101a.

The sealing member 104 is provided between the flange 14 and the housing 101. The sealing member 104 can have an annular shape. The sealing member 104 can be formed of a material having elasticity such as rubber or silicone resin.

When attaching the vehicle lighting device 1 to the vehicle lamp 100, the sealing member 104 is interposed between the flange 14 and the housing 101. Thus, an inside space of the housing 101 is sealed by the sealing member 104. In addition, as described above, the interface between the mounting portion 11 and the flange 14 is sealed by the sealing member 104. In addition, the bayonets 12 are pressed against the housing 101 by elastic force of the sealing member 104. Thus, the vehicle lighting device 1 can be suppressed to be separated from the housing 101.

The connectors 105 are fitted into end portions of the plurality of power supply terminals 31 exposed on the inside of the hole 17b. Power supply (not illustrated) and the like are electrically connected to the connectors 105. Therefore, power supply (not illustrated) and the like are electrically connected to the light emitting elements 22 by fitting the connectors 105 into the end portions of the power supply terminals 31.

In addition, the connectors 105 have stepped portions. Then, the sealing member 105a is attached to the stepped portions (see FIG. 3). The sealing member 105a is provided to prevent entrance of water on the inside of the hole 17b. When the connector 105 having the sealing member 105a is inserted into the hole 17b, the hole 17b is sealed to be water tightness.

The sealing member 105a can have an annular shape. The sealing member 105a can be formed of a material having elasticity such as rubber or silicone resin. The connector 105 can also be joined, for example, to an element on the socket 10 side using adhesive or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A vehicle lighting device to which electric power is supplied from a battery, the vehicle lighting device comprising:
a first circuit portion that has at least one light emitting element and a first resistor connected in series to the light emitting element;
a second circuit portion that is connected in parallel to the first circuit portion and has at least a control portion, the second circuit portion further including a constant current circuit connected in series to the control portion; and
a third circuit portion that is connected in series to the first circuit portion and the second circuit portion, and has at least one light emitting element,
the control portion configured to:
measure an input voltage and cause a current to flow through the third circuit portion in a case where the measured input voltage is a predetermined value, and
prevent the current from flowing through the first circuit portion in the case where the measured input voltage is the predetermined value.

2. The device according to claim 1,
wherein the second circuit portion further includes a second resistor connected in series to the control portion.

3. The device according to claim 1, further comprising:
a third resistor connected in series to the first circuit portion and the second circuit portion.

4. The device according to claim 2,
wherein, when a value of the current flowing through the first resistor is A, a value of the current flowing through the second resistor is B, the number of the light emitting elements provided in the first circuit portion and the third circuit portion is Na, and the number of the light emitting elements provided in the third circuit portion is Nb, the following expression is satisfied:

$(Na/Nb) \times A \times 0.95 \leq B \leq (Na/Nb) \times A \times 1.05.$

5. The device according to claim 2,
wherein the second resistor is a film-like resistor.

6. The device according to claim 1,
wherein the control portion causes a current to flow through the third circuit portion via the second circuit portion in the case where the measured input voltage is the predetermined value.

7. The device according to claim 6,
wherein a current obtained by adding the current from the first circuit portion to the current from the second circuit portion flows through the at least one light emitting element provided in the third circuit portion.

8. The device according to claim 6
wherein a current according to the input voltage of the predetermined value flows through the at least one light emitting element provided in the first circuit portion.

9. The device according to claim 1,
wherein the control portion prevents the current from flowing through the second circuit portion in a case where the measured input voltage exceeds the predetermined value.

10. The device according to claim 9
wherein the current according to the input voltage exceeding the predetermined value flows through the at least one light emitting element provided in the first circuit portion and the at least one light emitting element provided in the third circuit portion.

11. The device according to claim 3,
wherein the first resistor and the third resistor cooperate to control the current flowing through the at least one light emitting element provided in the first circuit portion and the at least one light emitting element provided in the third circuit portion.

12. The device according to claim 1,
wherein the control portion has either:
an input voltage determination circuit and a switching transistor, or
a comparator and a switching transistor.

13. The device according to claim 12,
wherein the input voltage determination circuit has a Zener diode, and
the comparator has an operational amplifier.

14. The device according to claim 12,
wherein the input voltage determination circuit or the comparator performs measurement of the input voltage.

15. The device according to claim 1,
wherein the third circuit portion is provided with a plurality of light emitting elements and the plurality of light emitting elements are connected in series.

16. The device according to claim 1,
wherein the first circuit portion is provided with a plurality of light emitting elements and the plurality of light emitting elements are connected in series.

17. The device according to claim 1,
wherein the constant current circuit uses one of: a constant current diode, a current limiter circuit using a transistor, and a constant current IC.

18. A vehicle lamp comprising:
the vehicle lighting device according to claim 1; and
a housing to which the vehicle lighting device is attached.

* * * * *